United States Patent [19]
Brown et al.

[11] Patent Number: 5,934,862
[45] Date of Patent: Aug. 10, 1999

[54] CONVEYOR MECHANISM

[75] Inventors: Thomas R. Brown, Oregon; Randal L. Zerbe, Rockford; Patrick C. O'Brien; James K. Bertsch, both of Oregon, all of Ill.

[73] Assignee: E.D. Etnyre & Co., Oregon, Ill.

[21] Appl. No.: 08/886,599

[22] Filed: Jul. 1, 1997

Related U.S. Application Data

[60] Provisional application No. 06/023,799, Aug. 6, 1996.

[51] Int. Cl.⁶ ................................................ B65G 17/12
[52] U.S. Cl. ........................................ 414/528; 198/833
[58] Field of Search ................................ 414/528, 327; 198/833, 841

[56] References Cited

U.S. PATENT DOCUMENTS

| | | | |
|---|---|---|---|
| 2,371,747 | 3/1945 | Faris et al. | 198/833 |
| 3,593,864 | 7/1971 | Moser | 198/833 X |
| 3,967,720 | 7/1976 | Arieh | 198/833 |
| 4,055,265 | 10/1977 | Eisenman | 414/528 X |
| 4,058,204 | 11/1977 | Arieh | 198/833 |
| 4,068,769 | 1/1978 | Sweet et al. | 414/528 X |
| 4,664,583 | 5/1987 | Gust | 414/528 |
| 4,880,109 | 11/1989 | Sarasola | 198/833 |
| 5,102,285 | 4/1992 | Gust | 414/528 |
| 5,104,281 | 4/1992 | Corvi | 414/528 |

FOREIGN PATENT DOCUMENTS

| | | | |
|---|---|---|---|
| 488919 | 6/1992 | European Pat. Off. | 198/833 |
| 5294428 | 11/1993 | Japan | 198/833 |
| 1602819 | 10/1990 | U.S.S.R. | 198/833 |
| 88/03117 | 5/1988 | WIPO | 198/833 |

Primary Examiner—James W. Keenan
Attorney, Agent, or Firm—Leydig, Voit & Mayer, Ltd.

[57] ABSTRACT

A conveyor mechanism is provided for transporting objects. The conveyor mechanism, in particular, includes a single continuous belt member wrapped around one or more chain loops and also around a pair of spaced-apart pulleys disposed outboard thereof. A first axle having one or more drive sprockets, a second axle having an equal number of idler sprockets, and a motor connected to the first axle are provided for driving the chain loops and the surrounding belt member. In use, the belt member maintains a constant linear velocity throughout its travel path (i.e., both inboard and outboard of the two sets of sprockets), due to the action of the pulleys. In this way, the velocities of the belt member and chains are synchronized at all points where they are in engagement (i.e., inboard of the sprockets), and slipping and/or stretching of the belt member with respect to the chains is advantageously prevented at its reversal points (i.e., outboard of the sprockets). A frame having substantially frictionless channel guide(s) provides additional support to the upper track portion of each chain so that the belt member can accommodate heavy loads.

21 Claims, 6 Drawing Sheets

CONVEYOR MECHANISM

RELATED APPLICATIONS

This application claims the benefit of our U.S. Provisional Application, Ser. No. 60/023,799, filed Aug. 6, 1996.

TECHNICAL FIELD OF THE INVENTION

The present invention relates generally to conveyor equipment and, in a particular use, to a conveyor mechanism for loading and unloading cargo from a trailer or the like.

BACKGROUND OF THE INVENTION

Conveyor mechanisms for loading and unloading cargo are well known. Such conveyor mechanisms are commonly used, for example, to load and unload various products (e.g., bulk agricultural crops, aggregate material, construction material, boxes, crates, etc.) from a vehicle (e.g., a trailer, a semi-trailer, a wagon, a truck, etc.).

Such conveyor mechanisms typically include a pair of chains loops disposed within and along the floor (or bed) of the trailer. The chain loops are usually engaged by a pair of drive sprockets arranged on a first axle and also by a pair of associated idler sprockets arranged on a second axle. Because the axles are ordinarily disposed at opposite ends of the trailer, the chain loops are generally obround in shape. A plurality of transverse slats extending between links of the opposed chains provide support to the chain loops and enable the conveyor mechanism to transport heavier loads. Such conveyor mechanisms are commonly known as slat-type conveyors. Examples of these types of devices are provided by U.S. Pat. Nos. 3,876,089 (Moser), 4,055,265 (Eisenman), 4,664,583 (Gust), and 5,102,285 (Gust).

In order to prevent abrasive material from damaging the chains, some slat-type conveyors include flexible belting which spans the width between the chains. By way of example, U.S. Pat. No. 4,664,583 (Gust) discloses a slat-type conveyor in which a plurality of segmented belts are attached to the slats. U.S. Pat. No. 5,102,285 (Gust), in contrast, discloses a slat-type conveyor in which a single continuous belt which is wrapped around the chains and is affixed to the various slats. The single belt slat-type conveyor disclosed in U.S. Pat. No. 5,102,285 (Gust), however, suffers from noted deficiencies which will be discussed herein.

First, in order to prevent slipping, bunching, and/or stretching of the belt at the points where the chains reverse direction (i.e., at the ends of the generally obround chain loops), the pitch diameter of the chains must coincide with the pitch diameter of the belt. In order to align these pitch diameters, however, the chain loops must be located outboard (i.e., beyond the width) of the belt. As a result, the belt cannot be wrapped around the chain loops, but must instead be wrapped around the slats which interconnect the chain loops. Furthermore, single belt slat-type conveyors of this type are limited to only two chain loops (i.e., one chain loop on either side of the width of the belt).

Second, single belt slat-type conveyors of this type are expensive to manufacture and service. For instance, because the load of the cargo is ultimately shared by only two chain loops, both of these chains need to be very sturdy (i.e., large and expensive). In a like manner, the slats interconnecting the two chain loops need to be spaced-apart at relatively close intervals (i.e., numerous slats are required). Also, the belt needs to be joined to the slats at regular intervals. This not only significantly increases assembly labor, but also makes field disassembly and repair extremely difficult and time consuming.

Third, single belt slat-type conveyors of this type are subject to damage by the contents of the cargo. The slats, for example, are susceptible to deformation by rocks or other solid objects in the trailer. The chains are also prone to damage because they ultimately support the weight of the cargo. More significantly, however, should one of the chains break during use, virtually all of the slats would be destroyed.

Fourth, single belt slat-type conveyors of this type are subject to inherently high frictional losses caused, in part, by the weight of the cargo. More specifically, the weight of the cargo frequently causes the slats to wear or rub against the bed of the trailer which, in turn, increases the power requirements of the motor.

OBJECTS OF THE INVENTION

Accordingly, a general object of the present invention is to provide a single belt conveyor mechanism in which the pitch diameter of the chains need not be the same as the pitch diameter of the belt.

Another object of the present invention is to provide a single belt conveyor mechanism in which numerous chains are utilized to support the belt along its full width.

A further object of the present invention is to provide a single belt conveyor mechanism which is capable of supporting and moving relatively high cargo loads.

A related object of the present invention is to provide a single belt conveyor mechanism which does not require slats to support the load of the cargo.

A more specific object of the present invention is to provide a slat-less, single belt conveyor mechanism for use in loading and/or unloading cargo from a trailer or the like.

An additional object of the present invention is to provide a single belt conveyor mechanism which is relatively inexpensive to manufacture and service.

Another object of the present invention is to provide a single belt conveyor mechanism that which is less susceptible to damage than presently-employed single belt slat-type conveyor mechanisms.

Yet another object of the present invention is to provide a single belt conveyor mechanism which is less prone to frictional losses than presently-employed single belt slat-type conveyor mechanisms.

Still another object of the present invention is to provide a single belt conveyor mechanism having the foregoing characteristics which is relatively simple to manufacture, and is reliable and convenient to use.

These and other objects, features, and advantages of the present invention will become apparent upon reading the following detailed description of a preferred exemplified embodiment and upon reference to the accompanying drawings.

SUMMARY OF THE INVENTION

The above objects are accomplished by providing a conveyor mechanism in which a single continuous belt member is wrapped around one or more chain loops and also around a pair of spaced-apart pulleys disposed outboard thereof. The chain loops are guided around oppositely disposed chain transition rollers, and are associated with drive means for driving the chain loops and the surrounding belt member. In use, the belt member maintains a constant linear velocity throughout its travel path (i.e., both inboard and outboard of the chain transition rollers) due to the action of the pulleys. In this way, the velocities of the belt member and chains are synchronized at all points where they are in engagement (i.e., inboard of the drive and idler sprockets), and slipping and/or stretching of the belt member with respect to the chains is advantageously prevented at its reversal points. A frame having substantially frictionless channel guide(s) provides additional support to the upper track portion of each chain so that the belt member can accommodate heavy loads.

BRIEF DESCRIPTION OF THE DRAWINGS

In the drawings, wherein similar reference numerals denote similar elements throughout the several views.

Figure 1:
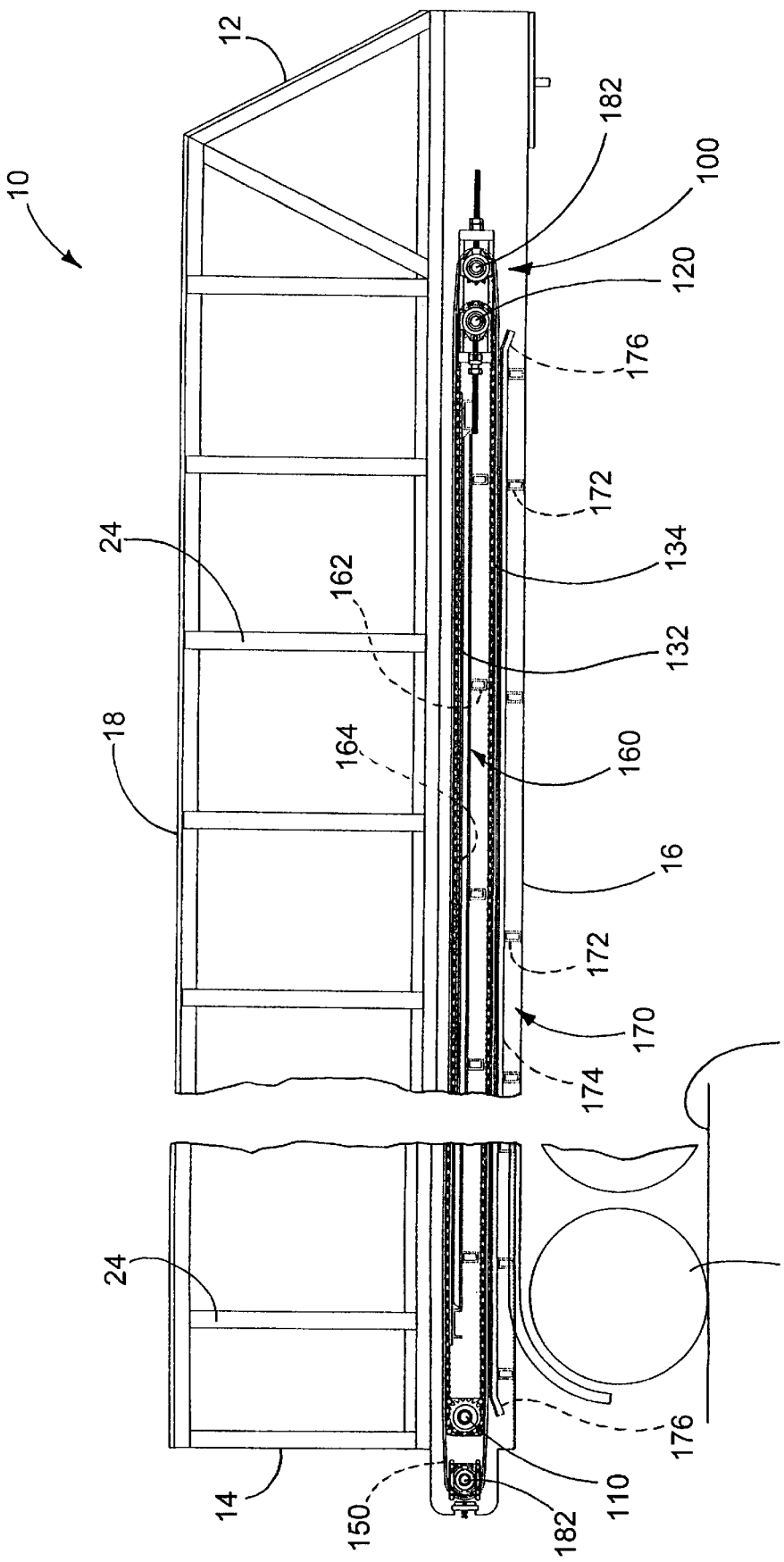
FIG. 1 is a partially fragmentary side elevational view of a trailer having a conveyor mechanism constructed in accordance with the teachings of the present invention.

While the present invention will be described and disclosed in connection with certain preferred embodiments and procedures, the intent is not to limit the present invention to these specific embodiments. On the contrary, the intent is to cover all such alternatives, modifications, and equivalents that fall within the spirit and scope of the present invention as defined by the appended claims.

DETAILED DESCRIPTION OF THE PREFERRED EMBODIMENTS

Turning now to the drawings, a conveyor mechanism constructed in accordance with the present invention and designated generally by reference numeral 100 is provided for transporting cargo (e.g., bulk agricultural crops, aggregate material, construction material, boxes, crates, etc.) relative to a structure. In accordance with one preferred embodiment of the present invention, the structure comprises a trailer assembly 10, and the conveyor mechanism 100 is mounted therein. Although the conveyor mechanism 100 of the present invention will be described and illustrated herein as being mounted within and transporting cargo relative to this trailer 10, it will be appreciated by those skilled in the art that the conveyor mechanism 100 may alternatively be used in other applications where heavy objects need to be moved.

Figure 2:
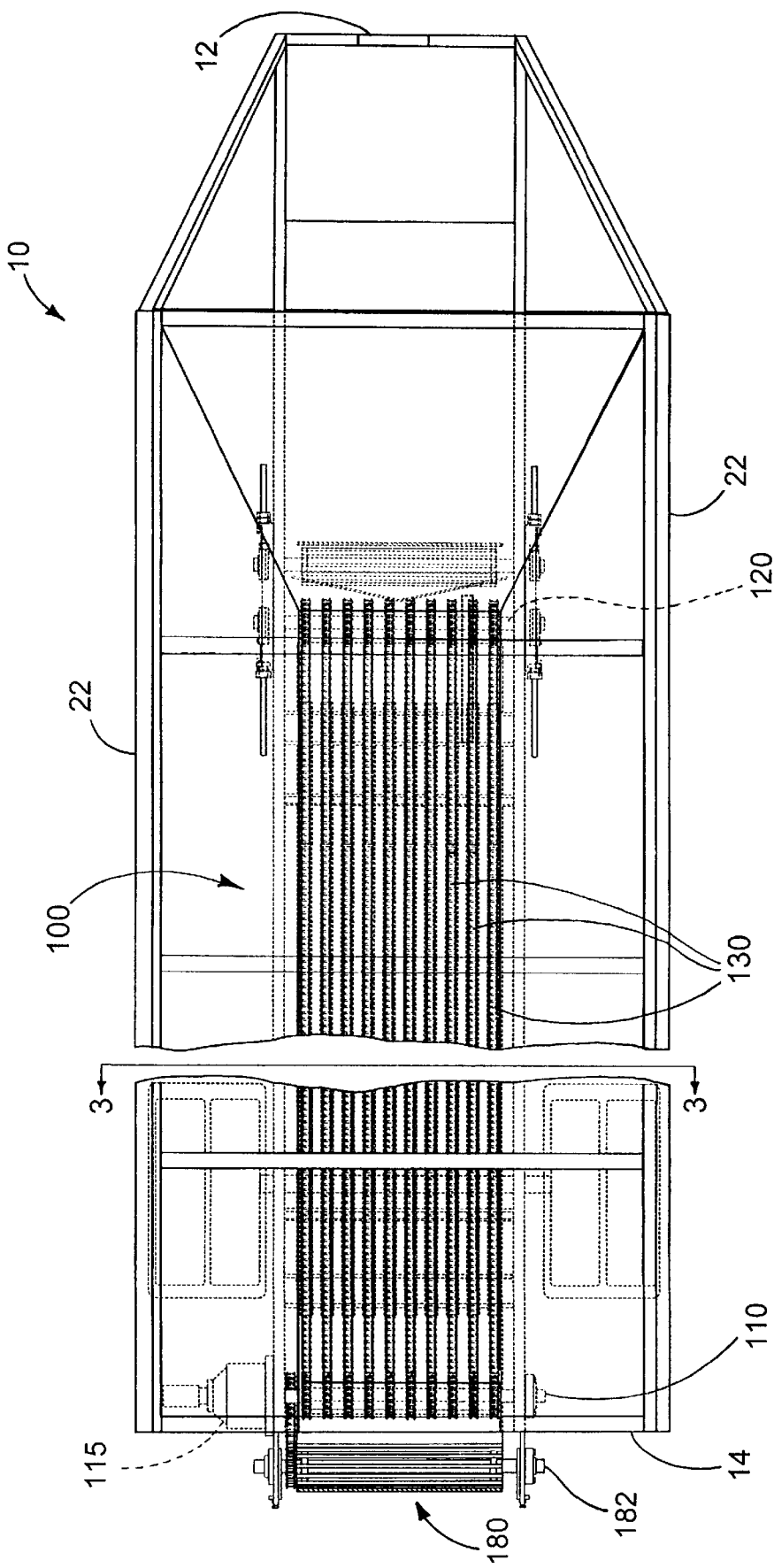
FIG. 2 is a top plan view of the conveyor mechanism and trailer depicted in FIG. 1.
Figure 3:
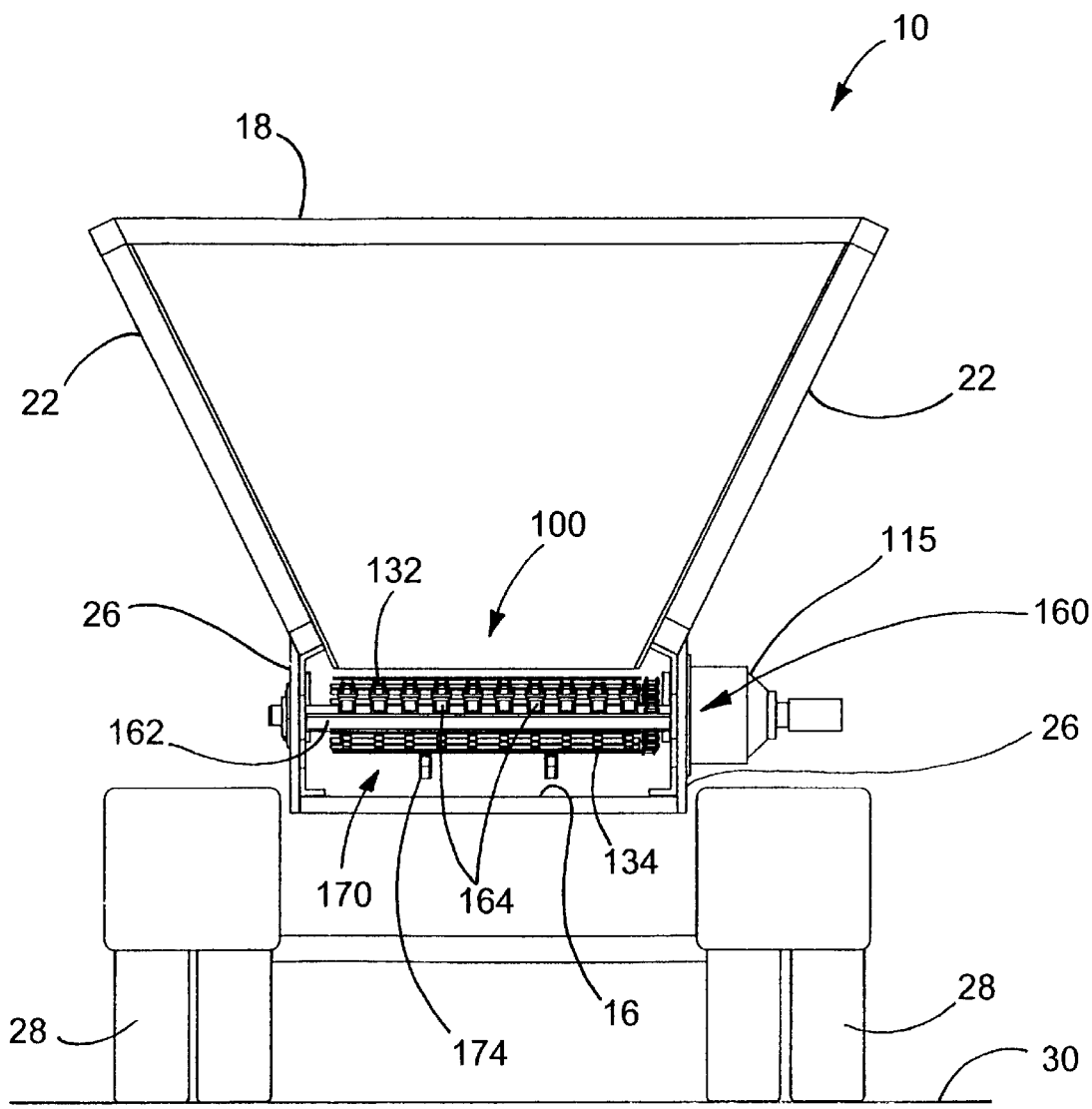
FIG. 3 is a cross-sectional view of the conveyor mechanism and trailer, as seen in the direction of line 3—3 in FIG. 2.

Referring initially to FIGS. 1–3, the trailer assembly 10 includes a forward end 12, a rear end 14, a bottom surface 16 (i.e., a floor or a bed), a top portion 18 (which may be open), and a pair of opposed side walls 22. In practice, the opposed side walls 22, the forward end 12, the rear end 14, and the conveyor mechanism 100 of the present invention define a bin where cargo is received. As is customary in the art, the bottom surface 16 of the trailer assembly 10 is spaced-apart from the ground 30 by a plurality of wheels 28, as shown, for example, in FIGS. 1 and 3. In addition, the forward end 12 of the trailer assembly 10 is adapted to be connected to the frame of a cab (not shown).

In the illustrated embodiment, the opposed side walls 22 extend between the forward and rear ends 12 and 14 of the trailer 10. The opposed side walls 22 also slope downwardly and inwardly from the top portion 18 of the trailer 10, as shown in FIG. 3. Because the trailer assembly 10 is intended for hauling heavy material, the opposed side walls 22 may also be reinforced with a plurality of bracing elements 24, as shown, for example, in FIG. 1. Each side wall 22 also includes a substantially vertical support plate 26 disposed at the lower end thereof. As best shown in FIG. 3, the conveyor mechanism 100 is mounted to, supported by, and positioned between the vertical support plates 26. The conveyor mechanism 100 is also positioned between the bottom surface 16 of the trailer 10 and the lower ends of the inclined side walls 22. The tapered wall hopper shown in the drawings is preferred for applications such as hauling heavy granular material such as stone or aggregate. In other applications, such as for hauling produce, a more conventional straight sided bin will be preferred. Accommodating the various bin shapes is accomplished simply by establishing the appropriate width and underlying support for the conveyor as will be described in detail herein.

Figure 4:
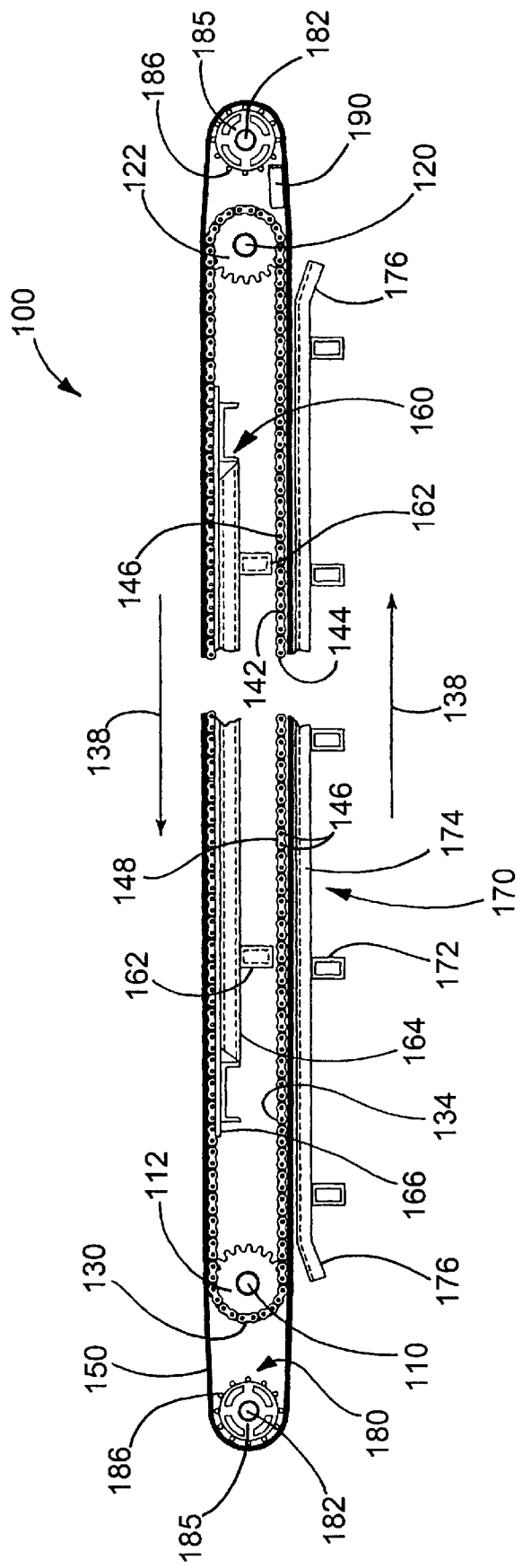
FIG. 4 is a partially fragmentary side elevational view of the conveyor mechanism.
Figure 5:
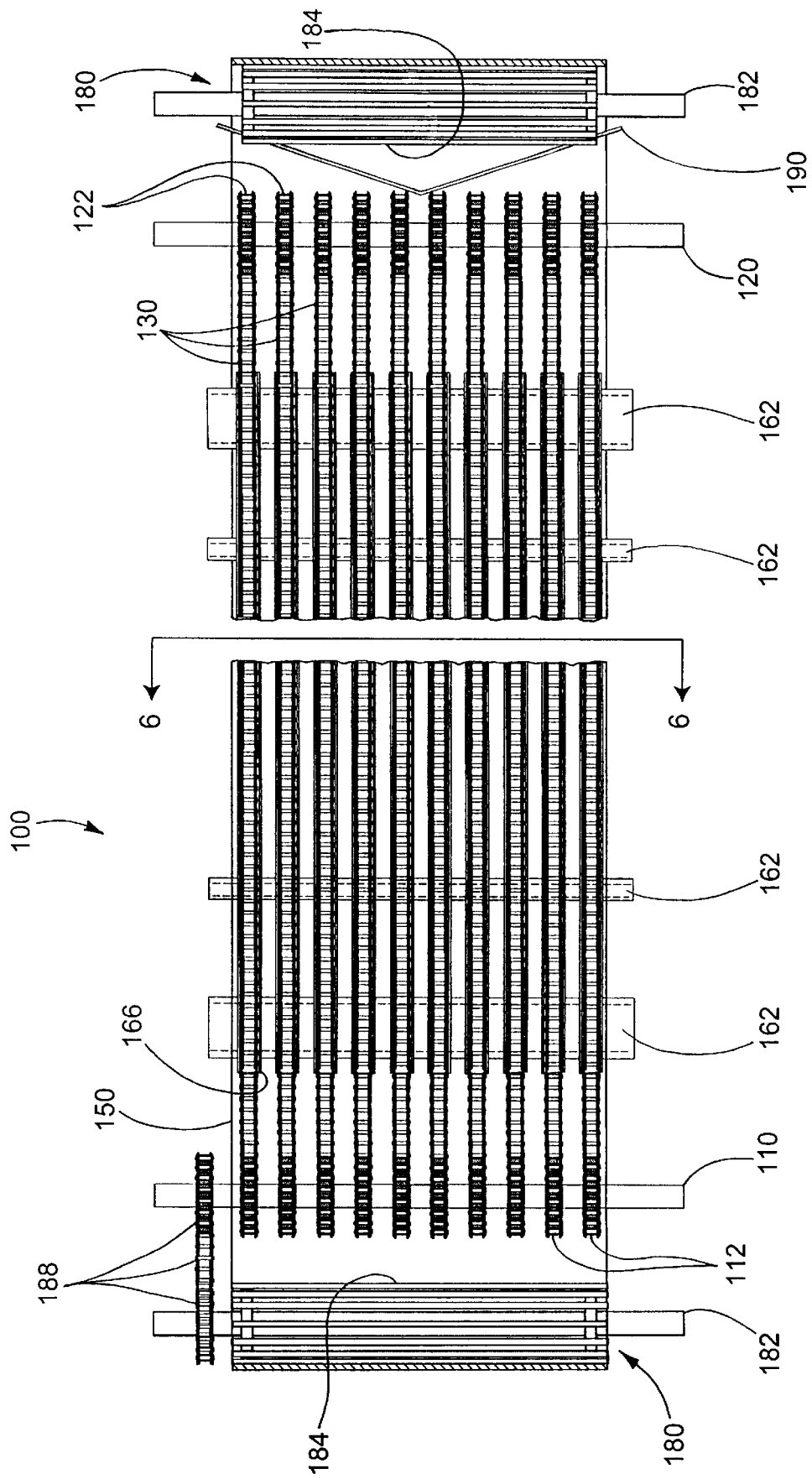
FIG. 5 is a top plan view of the conveyor mechanism depicted in FIG. 4, here showing the top portion of the flexible continuous belt member removed for clarity.

As best shown in FIGS. 1 and 2, the conveyor mechanism 100 of the present invention includes a first axle 110 disposed near the rear end 14 of the trailer 10, and a second axle 120 disposed toward the forward end 12 of the trailer 10. The first axle 110[, in particular], is rotatably mounted relative to the trailer assembly 10 and is arranged substantially parallel to the bottom surface 16 thereof. In the illustrated embodiment, the first axle 110 also includes a plurality of spaced-apart drive sprockets 112, as shown in FIGS. 4 and 5. In operation, the first axle 110 and the attached drive sprockets 112 are rotated by a power supply or motor 115, as depicted in FIG. 2. The second axle 120, like the first axle 110, is rotatably mounted relative to the trailer assembly 10 and is arranged substantially parallel to the bottom surface 16 thereof. As best shown in FIGS. 4 and 5, the second axle 120 is spaced-apart from the first axle 110 and includes a plurality of spaced-apart idler sprockets 122. As is customary in the art, each idler sprocket 122 is aligned with one of the drive sprockets 112, is associated with that drive sprocket 112, and forms a set therewith. In an alternative arrangement, the idler sprockets can be eliminated altogether, and the chain can be turned at the second end by a non-sprocketed roller with associated guides. Although the motor 115, the first axle 110, and the drive sprockets 112 are shown at the rear end 14 of the trailer assembly 10, it will be appreciated by those skilled in the art that the second axle 120 and the idler sprockets 122 may alternatively be located at the rear end 14 of the trailer assembly 10. The drive is applied to one of the end sets of sprockets for convenience, it being realized that, if desired, the drive sprockets can be positioned at any convenient location along the run of the chains.

A plurality of endless chains 130 are entrained in meshing engagement with the respective sets of drive and idler sprockets 112 and 122. As best shown in FIGS. 1 and 4, each chain 130 forms a generally obround loop having an upper track portion 132 and a lower track portion 134. More specifically, each chain 130 includes a plurality of pivotably connected inner links 142 and outer links 144. As is customary in the art, each outer link 144 is alternatively and contiguously connected to one of the inner links 142 via a common pivot pin and surrounding cylindrical roller 146. Each adjacent inner and outer chain link 142 and 144 further includes a pitch-line 148, as defined by a line extending through the axis of adjacent pivot pins and surrounding cylindrical rollers 146 (see FIG. 4).

When the first axle 110 is rotated by the motor 115, the chains 130 move in a direction generally indicated by reference numeral 138. Although the chains 130 are depicted as moving in this direction, it will be readily appreciated by those skilled in the art that the chains 130 may alternatively move in the opposite direction by reversing the direction of the motor 115. In this way, cargo may be moved in either direction.

As best shown in FIG. 4, a flexible continuous belt member 150 is wrapped around the chains 130 and also around a pair of spaced-apart pulleys 180 disposed outboard of the two sets of sprockets 112 and 122. More specifically, the belt member 150 frictionally engages the substantially flat upper track portions 132 of the chains 130 (i.e., the portions of the chain loops 130 disposed between the top of the drive and idler sprockets 112 and 122), and moves in conjunction therewith. Of course, a friction enhancing substance, or the like, may be applied to either the chain loops 130 or the inner surface of the belt member 150 in order to improve this frictional contact. Outboard of the sprockets 112 and 122, the belt member frictionally engages and wraps around the two pulleys 180. In this way, the sprockets 112 and 122 serve as reversal points for the chains 130, while the pulleys 180 serve as reversal points for the belt member 150. Of course, if the pulleys 180 were not provided (i.e., if the belt member 150 simply wrapped around the sprockets 112 and 122), the pitch diameter of the belt member 150 would be slightly greater than the pitch diameter of the chains 130 at the sprockets 112 and 122 (i.e., at the reversal points). This, in turn, would cause the linear velocity of the belt member 150 to be greater than the linear velocity of the chains 130 at these points (although the angular velocities would be the same) which, ultimately, would cause the belt member 150 to either slip or stretch in an unacceptable manner.

Thus, in keeping with an important aspect of the present invention, the two pulleys 180 automatically allow the belt member 150 to reverse direction without slipping or stretching. In particular, when the belt member 150 and the chains 130 are in frictional engagement, the velocities of the chains 130 and belt member 150 are identical because both are traveling in a straight line. When the belt member 150 separates from the chains 130 at the top of the drive sprockets 112 and at the bottom of the idler sprockets 122, respectively, however, the pulleys 180 will automatically assume an angular velocity which is equal to the angular velocity of the belt member 150 (if the pulleys 180 are not driven). In addition, the linear velocity of the belt member 150 will remain constant after it has separated from the chains 130 (i.e., the linear velocity of the belt member 150 will remain constant throughout its entire travel path). Thus, when the belt member 150 re-engages the chains 130 at the bottom of the drive sprockets 112 and at the top of the idler sprockets 122, respectively (i.e., 180° away from where the belt member 150 and the chains 130 originally separated), the linear velocity of the belt member 150 will be the same as the linear velocity of the chains 130. In this way, the velocity of the belt member 150 is synchronized with the velocity of the chains 130 at all points where they are in engagement (i.e., inboard of the drive and idler sprockets 112 and 122), and slipping and/or stretching of the belt member 150 with respect to the chains 130 at its reversal points is advantageously prevented. Indeed, without the pulleys 180 and the speed synchronization feature that they provide, the belt member 150 would either slip or stretch with respect to the chains 130 at these reversal points.

In operation, the pulleys 180 are normally driven by frictional contact with the moving belt member 150. If additional conveyor force is required, however, the pulleys 180 may alternatively be powered by an independent power source (not shown), or be powered by an optional drive chain and sprocket assembly 188, as shown, for example, in FIG. 5. If the pulleys 180 are driven by frictional contact with the moving belt member 150 (i.e., if the pulleys 180 rotate independently of the drive and idler sprockets 112 and 122), the speed synchronization feature is provided automatically since the pulleys 180 will be driven at the angular velocity necessary to match the linear velocity of the belt member 150. If however, the pulleys 180 are powered independently or are powered by the optional drive chain and sprocket assembly 188, the speed synchronization feature can be provided by varying either or both the diameter of the driven pulley and/or the rotational speed of the driven pulley. This rotational speed adjustment would normally be made in the gear or sprocket ratio of the first axle 110 and the shaft 182 of the driven pulley.

In either event, the objects being transported are loaded, piled, or stacked upon the moving belt member 150. However, because the weight of the cargo is shared by several (i.e., one or more) chain loops 130, the conveyor mechanism 100 of the present invention can use lighter, smaller, and less expensive chains 130 than the single belt slat-type conveyor mechanisms of the prior art (e.g., the conveyor mechanism disclosed in U.S. Pat. No. 5,102,285 (Gust)).

Figure 6:
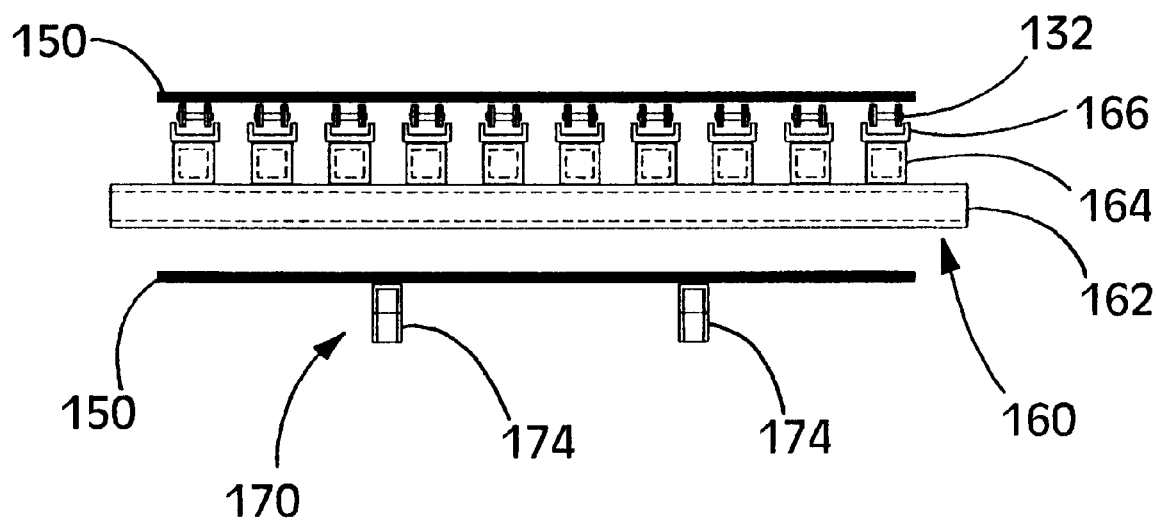
FIG. 6 is a cross-sectional view of the conveyor mechanism as seen in the direction of line 6—6 in FIG. 5, here showing the lower track portion of the chain removed for clarity.

In order to provide added support to the chains 130 and belt member 150, a frame 160 having a plurality of substantially frictionless channel guides 166 is arranged within the loop of each chain 130. As best shown in FIG. 3, the frame 160 includes a plurality of transverse members 162 which extend between and are mounted to the vertical support plates 26 of the trailer assembly 10. The frame 160 also includes and a plurality of longitudinal members 164 which are attached to the transverse members 162. As shown in FIGS. 4–6, the longitudinal members 164 are arranged substantially perpendicular to the transverse members 162, the channel guides 166 are attached to the longitudinal members 164, and the channel guides 166 receive the upper track portions 132 of each respective chain 130. In keeping with an important aspect of the present invention, each channel 166 is either constructed from or coated with a friction reducing surface (e.g., polymer material). In this way, friction losses are substantially reduced. The channels 166 also guide the chains 130 in a way that provides lateral stability to the chains 130 and belt member 150. In operation, the conveyor mechanism 100 of the present invention can easily accommodate heavy loads because: (1) the transverse members 162 of the frame 160 are mounted directly to the support plates 26 of the trailer 10; and (2) numerous chains 130 are spaced across the width of the belt member 150.

A support assembly 170 is also provided for supporting the underneath side of the belt member 150 and the lower track portions 134 of the chains 130. As best shown in FIG. 1, the support assembly 170 is disposed between the bottom surface 16 of the trailer assembly 10 and the belt member 150. In the illustrated embodiment, the support assembly 170 includes a plurality of transverse beams 172 arranged generally parallel to the transverse members 162 of the frame 160, as shown, for example, in FIG. 4. The support assembly 170 also includes one or more longitudinal beams 174 arranged generally perpendicular to the transverse beams 172 and attached to the under side thereof. As shown in FIGS. 1 and 4, the longitudinal beams 174 preferably include bent-down end portions 176 which prevent the belt member 150 from becoming entangled therewith.

A deflector plate 190—disposed between the idler sprockets 122 and the forwardmost pulley 180—is also provided for dislodging stones, rocks, and other debris from the inner surface of the belt member 150. As shown in FIGS. 4 and 5, the deflector plate is generally V-shaped and is arranged adjacent to the inner surface of the belt member 150. In use, the deflector plate 190 prevents debris from entering the forwardmost pulley 180 which helps reduces chain wear and sprocket damage.

In a practical implementation of the invention, the width of the belt is on the order of three feet. Underlying the belt there are provided approximately ten chains riding in ten guide tracks spaced substantiallyuniformly across the three foot width of the belt.

In other lighter duty applications, fewer chains can be utilized. For example, a system can be provided in which only three chains underlie the belt and are driven on three sprockets supported on a common shaft and spaced at substantially equal distances across the length of the shaft. The three sprockets drive three chains which in turn ride in three guide tracks. The guide tracks support the top flights of the chains and the chains support the belt.

In summary, the present invention provides a new and improved conveyor mechanism which is particularly suited to a live bottom trailer, but can be used in other conveyor type applications. The drive for the conveyor mechanism comprises one or more endless loop chains which define the conveyor path. An endless belt wraps the chain or chains, the chains being in contact with the underside of the top run of the belt so that the chains drive the belt by frictional engagement. Thus, the load carrying capacity of the belt is substantially increased because the drive forces are applied continuously along its undersurface, as contrasted with a more conventional arrangement which would drive a pulley carrying the belt and thereby tend to stretch the belt when under load. Turning of the driving chain and load carrying belt is accomplished without bunching or slipping of the belt by means of the separate chain and belt transition rollers. Finally, a support structure which underlies the top run of chains provide substantial and, where needed, distributed load carrying capacity, to configure the conveyor mechanism for a plurality of types of material conveying applications.

While the present invention has been described and disclosed with an emphasis upon preferred embodiments, it will be understood, of course, that the present invention is not strictly limited thereto. Since modifications may be made to the structures disclosed herein—particularly in light of the foregoing teachings—without departing from the invention, the following claims are intended to cover all structures that fall within the scope and spirit of the present invention.

What is claimed:

1. A conveyor system comprising in combination:
    a support structure,
    a chain drive carried by the support structure and including a plurality of drive chains tensioned around a pair of transition rollers to define upper chain flights and lower chain flights joined at the transition rollers,
    means for driving the chains for concurrent rotation about the chain transition rollers,
    a load-carrying endless belt disposed around the chains and having an upper run overlying and supported by the upper chain flights, and a lower run underlying the lower chain flights,
    guide rollers for the belt positioned outboard of the chain transition rollers for transitioning the belt between the upper run and the lower run, the belt guide rollers being positioned outboard of the chain transition rollers so that the belt is out of contact with the chains during the transition from the upper run to the lower run,
    a plurality of rigid guide tracks one for each drive chain, the guide tracks being fixed to the support structure and positioned to guide and support the upper flights of the chains, whereby a load placed on the belt is driven by frictional contact between the belt and chain,
    the plurality of guide tracks and chains being sufficient in number to support the endless belt when carrying loads distributed on the belt.

2. A conveyor system as defined in claim 1 wherein the guide track comprises an elongate support underlying and guiding the upper chain flights.

3. A conveyor system as defined in claim 2, wherein the guide tracks comprise elongate support channels underlying and guiding the upper chain flights, each channel having a width slightly greater than the width of the associated chain for guidance thereof, the channels providing guidance and support to the upper chain flights which in turn provide support to the upper run of the load-carrying belt for carrying of loads thereon when driven by the drive chains.

4. A conveyor system as defined in claim 3, wherein there is further provided a hopper having a length at its bottom which is approximately the same as the length of the upper run and having a width which is slightly less than the width of the belt, the bottom of the hopper closely overlying the belt so that running of the belt by driving of the chains will effect the unloading of the hopper.

5. A conveyor system as defined in claim 4, wherein the support structure is a bed of a trailer, the hopper being a load carrying structure of the trailer, and the conveyor serving as a live bottom for the trailer.

6. The conveyor system as defined in claim 5, wherein the hopper has a width which tapers toward the bottom thereof to a width at the bottom which is slightly less than the width of the belt.

7. A conveyor system as defined in claim 6, wherein the width of the belt is on the order of three feet, and there are provided approximately ten chains and chain guide tracks spaced substantially uniformly across the three foot width of the belt.

8. A conveyor system as defined in claim 5, wherein one of the chain transition rollers include at least three sprockets supported on a common shaft and spaced at substantially equal distances across the length of the shaft, the system further comprising three drive chains and three guide tracks for supporting the top flights of the respective chains.

9. A conveyor system as defined in claim 5, wherein the belt guide rollers have a diameter which is sized to provide a smooth belt transition from the upper run to the guide rollers and from the guide rollers to the lower run, and are positioned so that the upper run of the belt follows a substantially continuous straight line from one belt guide roller through a supported section overlying the upper chain flight to the other belt guide roller.

10. A conveyor system as defined in claim 9 in which drive means are provided for at least one of the transition rollers, the driven transition roller being sized to synchronize the speed of the belt with the speed of the chains when the belt and chains are in contact.

11. A conveyor system as defined in claim 5, wherein there are provided a plurality of horizontal support members affixed to the support structure and underlying the guide tracks for providing rigid support for the guide tracks and thereby the load carried by the belt.

12. A conveyor system as defined in claim 1, wherein the drive means is a drive connected to one of the chain transition rollers, the other chain transition roller being an idler roller.

13. A conveyor system as defined in claim 12, wherein there is further included a secondary drive means coupling one of the chain transition rollers to one of the belt guide rollers thereby to provide an assist drive to the belt.

14. A conveyor system for transferring a load from a load carrying hopper and comprising in combination:

a hopper structure having an open top with front, back and side walls terminating in a bottom opening of a given length and width, a conveyor mechanism positioned just below the hopper bottom and having a width which is about the same as the given width, the conveyor mechanism having a chain drive and support including a plurality of drive chains distributed across the width of the conveyor and tensioned about chain transition rollers positioned near the front and back of the hopper, the chain transition rollers defining an upper chain flight and a lower chain flight with the upper chain flight being positioned just below the bottom of the hopper, an endless belt positioned around the chains and having upper and lower runs separated by belt transition rollers which are separate from the chain transition rollers, the belt transition rollers being positioned outboard of the chain transition rollers so that the upper run of the belt follows a plane defined by the upper flights of the chains which continues from each chain transition roller to each belt transition roller, the upper run of the belt covering all of the upper chain flights for being driven thereby and closing the bottom opening of the hopper, the respective transition rollers being positioned so that the transition of the belt from the upper to the lower run occurs when the belt is out of contact with the chains, a plurality of guide tracks, one for each upper flight and underlying the upper flights to support each chain during the majority of its travel along the upper flight, thereby to assist in carrying a load imposed by material in the hopper carried on the belt, and drive means for the chains which causes the chains to rotate in a first direction to carry the upper run of the belt in such a direction as to convey material in the hopper toward the back of the hopper for unloading.

15. A conveyor system as defined in claim 14, wherein the drive means is reversible so as to cause the chains to rotate in a second direction to convey material into the hopper.

16. A conveyor system as defined in claim 14, wherein the guide tracks comprise elongate support channels underlying and guiding the upper run of each drive chain, the channels having a width slightly greater than the width of the drive chains for guidance thereof, the channels providing guidance and support to the upper runs of the chains which in turn provide support to the upper run of the load-carrying belt for carrying of loads thereon when driven by the drive chains.

17. The conveyor system as defined in claim 14, wherein the hopper is mounted to a wheeled trailer for securing as a load carrying structure of the trailer, and the conveyor system serving as a live bottom for the trailer.

18. A conveyor system as defined in claim 17, wherein there are provided a plurality of horizontal support members affixed to the support structure and underlying the guide tracks for providing rigid support for the guide tracks and thereby the load carried by the belt.

19. A conveyer system as defined in claim 17, wherein the sidewalls of the hopper taper toward the bottom thereof to a width which is slightly less than the width of the belt.

20. A conveyor system as defined in claim 14, wherein the drive means is a drive connected to one of the chain transition rollers, the other chain transition roller being an idler roller.

21. A conveyor system as defined in claim 20, wherein there is further included a secondary drive means coupling one of the chain transition rollers to one of the belt transition rollers thereby to provide an assist drive to the belt.

* * * * *